United States Patent
Wolbarst

[15] 3,699,867
[45] Oct. 24, 1972

[54] DISTANCE ESTABLISHING ARRANGEMENT FOR PHOTOGRAPHIC CAMERA

[72] Inventor: John Wolbarst, Boston, Mass.
[73] Assignee: Polaroid Corporation, Cambridge, Mass.
[22] Filed: Feb. 17, 1969
[21] Appl. No.: 799,699

[52] U.S. Cl. .................................................95/44
[51] Int. Cl. ..........................................G03b 13/20
[58] Field of Search.........................................95/44

[56] References Cited

UNITED STATES PATENTS

| | | | |
|---|---|---|---|
| 729,948 | 6/1903 | Lewis | 95/44 C |
| 926,912 | 7/1909 | Vogt et al. | 95/44 C |

FOREIGN PATENTS OR APPLICATIONS

| | | | |
|---|---|---|---|
| 1,200,123 | 9/1965 | Germany | 95/11 V |

*Primary Examiner*—John M. Horan
*Attorney*—Brown and Mikulka, William D. Roberson and Gerald L. Smith

[57] ABSTRACT

A distance determining device for popularly priced photographic cameras. The device cooperates with a conventional viewfinder to permit the establishing of a predetermined camera-to-subject distance by moving the position of either the photographic subject or the camera. The apparatus provides a transparent member or the like by which a segment of the field of view observed through a viewfinder is visibly differentiated from the remainder of the field. The member is configured such that it encompasses within the field of view, the vertical dimension of a human head when a predetermined camera-to-subject distance has been established. In a preferred embodiment, the segment is visibly contrasted from the remainder of the field of view by a color differential.

9 Claims, 7 Drawing Figures

PATENTED OCT 24 1972
3,699,867
SHEET 1 OF 2
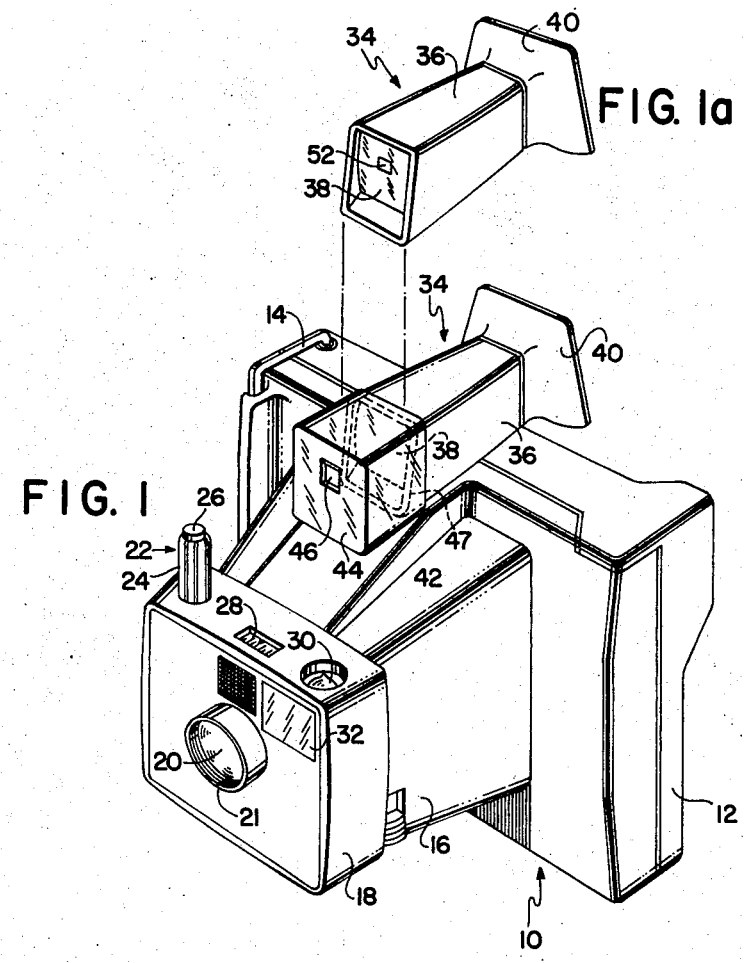
FIG. 1a
FIG. 1
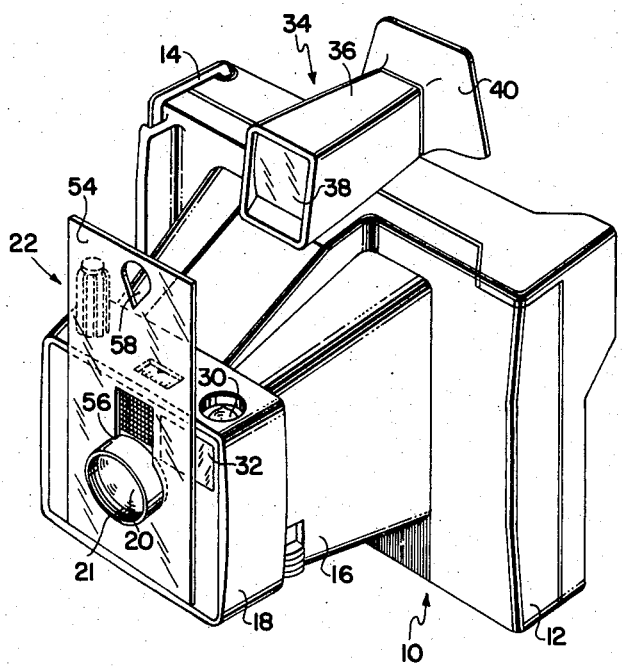
FIG. 6
INVENTOR.
JOHN WOLBARST
BY
Brown and Mikulka
ATTORNEYS

PATENTED OCT 24 1972 3,699,867

INVENTOR.
JOHN WOLBARST

BY

Brown and Mikulka
ATTORNEYS

DISTANCE ESTABLISHING ARRANGEMENT FOR PHOTOGRAPHIC CAMERA

The present invention relates to photographic devices and more particularly to an arrangement which may be incorporated with the viewfinder of a camera for establishing a camera-to-subject distance appropriate for flash photography.

BACKGROUND OF THE INVENTION

Conventional low cost photographic cameras are designed to provide a reliable and consistent performance within the range of photographic environments most often encountered by the amateur photographer. To derive an acceptably high success rate for the "snapshot photography" for which the cameras are intended, their design is tailored to not only meet rigid cost limitations but also to limit the number of adjustments to the exposure mechanism required for any one photograph. These design aspects are most commonly accounted for through the use of a fixed focus lens system mounted within a rigid camera body housing. The exposure systems of the cameras are provided with apertures representing very high $f$ numbers to provide a depth of field adequate to accommodate most amateur photographic situations. As a consequence the photographer need not consider camera-to-subject distance nor make adjustments to the camera mechanism to accommodate for this distance. In most applications, all exposure parameters but exposure aperture are fixed at values accommodating conventional photographic scenes.

To expand their usefulness, the low cost cameras are now structured to incorporate mounting devices and switching for providing flash illumination. In this mode of operation the scope or range of performance of the cameras is somewhat limited in comparison to their use with ambient illumination. For instance, the amateur photographer must remain aware of camera-to-subject distances with respect to the output capacity of a flashbulb being utilized. The light generating capacity of the bulbs is generally computed in accordance with the "inverse square law" which assumes that the light emanating from the bulb dissipates in proportion to the square of the distance from the source. As a consequence of this restriction, the photographer cannot rely on a large built-in depth of field and fixed focus, but must determine the optimum camera-to-subject distance and make the exposure at that range only.

Distance determining devices are not provided with conventional inexpensive cameras. Consequently, an unfortunately large number of exposures made by amateur photographers with flash illumination are aborted. Further in this regard, the amateur photographer is often not mindful of the difference of operational scope of the cameras when using artificial illumination as opposed to ambient lighting. An inexpensive means, therefore, is required beyond mere admonitions in film package instructions for reminding the photographer to determine the optimum camera-to-subject distance and to photograph only within the operational capacities of the flashbulb.

Subject-to-camera distance determination also becomes critical where popular priced cameras are designed for use with slower speed films, for instance color films, or for other design conditions requiring relatively wide (low) aperture settings. For such applications, a simplified lens focusing arrangement may be provided which is manually adjustable at distance settings corresponding to the camera operator's visual estimation. Where, at relatively shorter camera-to-subject distances, the lens system of a camera defines relatively low apertures, only a limited depth of field will be available. As a consequence, the range from camera to subject must be gauged by the operator with accuracy. Conversely, at more extended ranges, a wider depth of field permits the broad tolerances required for focusing with camera operator estimated ranges. Generally, fabrication cost considerations preclude the incorporation of semiautomatic ranging devices with the popular priced cameras now described. Consequently, an inexpensive but accurate alternative range determining system is needed for shorter camera-to-subject distances where depth of field tolerances are limited.

SUMMARY OF THE INVENTION

The present invention provides a unique means for aiding an amateur photographer in establishing an optimum camera-to-subject distance for flash photography or for photographic situations characterized by low depth of field tolerances. Using a very simple and inexpensive attachment to or alteration of the viewfinder provided with a camera, the critical distance required either for deriving an optimum flash exposure or for short range, low relative aperture focusing may be easily established by the operator while sighting through the viewfinder.

The arrangement of the invention functions with the viewfinder to differentiate a commonly encountered photographic subject, such as the human head, which, by virtue of its adequately uniform dimension, for instance its vertical dimension from the top of the head to the bottom of the chin, allows proper subject distance to be established by moving the location of either the camera or the subject. To derive a distance defining relationship between such a subject of known dimension and an optimum camera-to-subject distance, a selectively dimensioned portion of a conventional viewfinder is altered such that it can be visibly differentiated from the remainder of the field of view. The geometric relationship existing between the dimensioning of this portion and that of the uniformly dimensioned subject matter is then used in moving either the camera or subject matter to a position defining an optimum camera-to-subject distance.

In one aspect of the invention a simple attachment incorporating the visibly differentiating segment is slidably inserted over the viewfinder of a camera. In another arrangement, the differentiating portion is provided by mounting the selectively dimensioned portion over one lens of the viewfinder.

Another object of the invention is to provide a range determining accessory for an inexpensive camera in which a visibly differentiating segment is formed of a transparent but colored material such that it may be used in the manner comprehended without requiring the eye to somewhat simultaneously focus at the forward lens of the viewfinder and at the subject being photographed. In another arrangement, the attachment provides for covering all of the field of view but the differentiated portion with a transparent colored medium to accomplish the distance defining function.

It will be apparent that by inserting the simple device of the invention into the viewfinder function of an inexpensive camera, an amateur photographer will be consistently apprised of the necessity for maintaining an optimum camera-to-subject distance for flash photography. Inasmuch as the manufacturer of the camera selects an appropriate distance, such flash exposures as are taken with the device of the invention will always be taken at an optimum distance thereby assuring a higher reliability in flash photography. The inventive system overcomes the absence of a rangefinding implement commonly employed with more expensive cameras, while providing a range determining function at a nominal production cost.

The above and other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a popularly priced photographic camera incorporating one embodiment of the present invention;

FIG. 1a is a perspective view of a viewfinder for the camera arrangement of FIG. 1 incorporating an alternate embodiment of the invention;

FIG. 6 is a perspective view of a popularly priced photographic camera incorporating still another embodiment of the instant range determining invention.

DETAILED DESCRIPTION OF THE DRAWINGS

Figure 2:
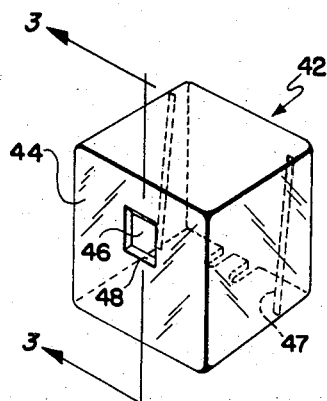
FIG. 2 is a perspective view of the embodiment of the invention pictured in FIG. 1, showing its structure in more detail.

The ranging implement of the instant invention may be fabricated in a number of relatively simple configurations. As a consequence, it will be found to function with most varieties of photographic cameras. For the present illustrative purposes, the invention is described in connection with a popularly priced photographic camera of the self-developing variety. To facilitate the discussion to follow, component parts of this camera which remain identical throughout the figures are provided with the same numeration.

Referring to FIG. 1, the photographic camera is shown formed from a somewhat unitary housing having a main body portion or film chamber 12 for retaining a quantity of film, an exposure plane, and instrumentation for a self-developing process. The body portion 12 is formed of two cooperatively hinged portions which are secured together by a clasp 14. Extending from the central portion of the main body 12 and aligned with the exposure plane of the camera is a lighttight, rigid exposure chamber 16. Chamber 16 supports an exposure mechanism housing 18, the instrumentation within which serves to adjust the exposure parameters of the camera. For instance, the housing 18 includes an objective lens 20 fixed within a cylindrical mounting 21 and a dual purpose actuator button 22 having an aperture adjusting knob portion 24 and a shutter release portion 26. With the latter aperture adjustment function 24, there is mechanically coupled an index and scale visible to the camera operator at 28. By adjusting the aperture blades of the exposure system to an index mark on this scale, the aperture of the optical path may be adjusted in conformance with a camera-to-subject distance selected by the manufacturer for use in a flash mode of operation. To provide for flash illumination, a chamber for holding a flashbulb 30 is positioned within housing 18 behind a transparent window in its front face at 32.

A viewfinder assembly, shown generally at 34 is mounted on the uppermost portion of the body portion 12. Viewfinder 34 is formed having a body portion 36 aligned somewhat with the optical path of the camera within which are mounted lens elements one of which is shown at 38. A flexible rubber light shield 40 is attached to the rearmost end of the body portion 36 and is configured for positioning before the eye of the camera operator.

To permit a positioning of the camera at a distance from a subject selected as most desirable for flash illumination, an attachment shown generally at 42 is mounted over the forward face of the viewfinder 34. Attachment 42 has a cubic configuration and is dimensioned so as to be positionable in sliding relationship over the frontal portion of viewfinder housing 36. The attachment 42 is fabricable from a transparent or translucent plastic and is formed having a forward face 44 extending across the field of view provided by the viewfinder lens system. A segment or rectangular portion 46 of the face 44 is removed such that when the entire assembly is viewed through viewfinder 34, the segment 46 will be apparent or visibly differentiated. A ledge as at 47 may be formed along the interior surface of the attachment which, when positioned against the front edge of body portion 36, will assure proper alignment.

Figure 3:
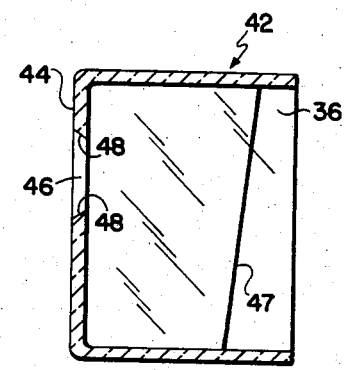
FIG. 3 is a cross-sectional side view of the implement of FIG. 2 taken along the section 3—3 of FIG. 2.

Referring to FIGS. 2 and 3, this segment 46 is revealed in more detail. Upon determining an optimum camera-to-subject distance for the flash system of the camera, the manufacturer dimensions segment 46 by resorting to a stadiometric form of relationship. Inasmuch as the normal adult human head has a vertical dimension which may be considered uniform for the purpose at hand for instance the vertical dimension, from the top of the head to the bottom of the chin, the vertical dimension of the segment 46 is adjusted such that when viewed through a viewfinder, a human head will appear to fill the segment. A preselected camera-to-subject distance is simply established with the arrangement by moving either the camera or the position of the subject until the head dimension is coextensive with the segment dimension. To aid in visibly differentiating between the plastic surface 44 and the edges of the segment 46, (or between the segment itself) the rectangular periphery of segment 46 may be beveled as at 48 to provide a refractive effect. The selection of a human head for the instant purposes is appropriate inasmuch as human beings constitute the most commonly encountered photographic subjects in amateur flash photography.

Figure 4:
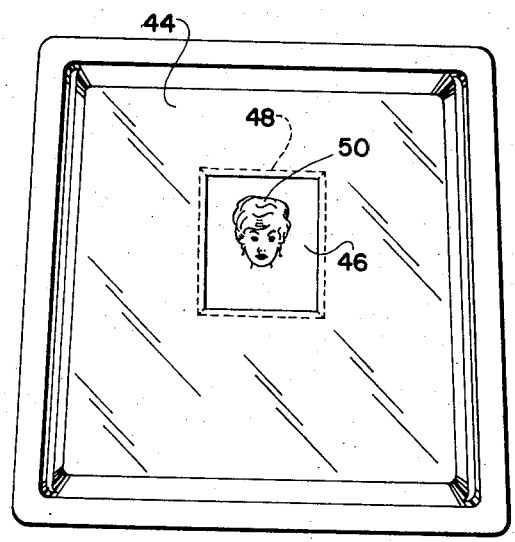
FIG. 4 is a pictoral representation of a field of view witnessed through the eyepiece of a viewfinder showing a photographic subject and its relation to the differentiated portion of the field of view.
Figure 5:
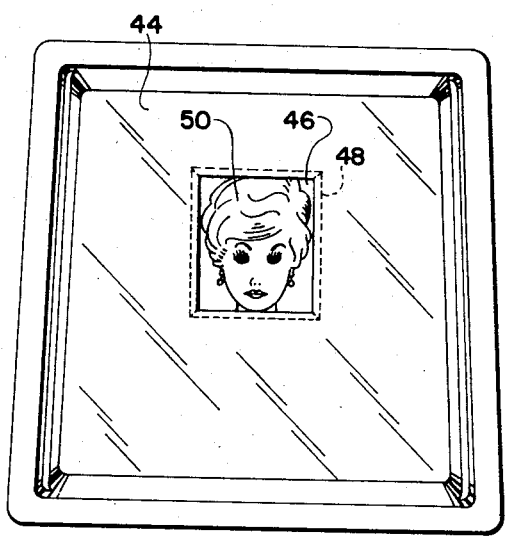
FIG. 5 depicts the subject matter of FIG. 4 showing, however, the relationship of a human subject when a desired camera-to-subject distance has been established.

Referring to FIGS. 4 and 5, the above discussed procedure for bringing the camera into coincidence with the desired camera-to-subject distance is illustrated. The figures show the portion of the field of view within the segment 46 observed by a camera operator during the process of achieving an appropriate subject distance. Note that in FIG. 4 the human head 50 does not fill the visibly differentiated area. Accordingly, when such relationship is observed by the camera operator, the camera-to-subject distance for flash photography or other wide aperture applications is inappropriate. In FIG. 5 a proper relationship between the segment 46 and human head 50 is shown. The figures do not show the remainder of the field of view, however, the entire field of view will be visible through the forward transparent face 44 of the attachment 42.

Referring to FIG. 1a, another embodiment for the invention is illustrated in connection with the viewfinder 34. In this arrangement, the visibly differentiated segment is a rectangular area 52 which is positioned on the forward lens element 38 of the viewfinder. Area 52 is dimensioned using the considerations as above described and, for simplicity, may be formed upon element 38 as a piece of colored plastic. Attachment may be accomplished by means of hot stamping or the like. It will be apparent that when using the embodiment of FIG. 1a, the appropriate camera-to-subject distance is established using the same technique as described above in connection with FIGS. 4 and 5.

In the embodiments thus far described, it will be found helpful to fabricate the attachment or segment portion in a colored transparent material. Inasmuch as human visible acuity varies considerably, many users of the distance establishing device may find it difficult to simultaneously observe the outlines of the differentiated segment and the field of view of the scene being photographed. Where the differential between the field of view and segment is one of color, it is not necessary for the eye to focus upon the edge of the differentiated segment simultaneously with the head of a subject. With such arrangement, the camera operator need only assure that the image of the human head fills a colored portion within the viewfinder.

Referring to FIG. 6, a third embodiment of the invention is illustrated. In this arrangement, a flat, transparent piece of plastic material 54 is fabricated having an annular cutout section 56 which is dimensioned to fit over the cylindrical mounting 21 of lens 20 to provide a press fit for holding the assembly in a vertical position. A rectangular opening is provided at 58 so as to provide an unhindered light path into a photocomparator arrangement. The upper portion of the plastic member 54 is formed having a head, ovular or pear shaped cutaway portion 58. For the purpose intended, portion 58 may also be oval or rectangularly shaped. The cutaway portion 58 is dimensioned and appropriately aligned with the optical axis of the viewfinder 34 so as to perform the distance deriving function earlier described. For instance, when the image of a human head appears to fill the cutaway portion 58, an appropriate camera-to-subject distance will have been achieved.

It will be apparent to those versed in the photographic art that the distance establishing arrangement of the invention may assume a variety of configurations depending upon the model of camera with which it is used. Where appropriate, as discussed in connection with FIG. 1a, the arrangement may be inserted within the viewfinder assembly of a camera during the production of the camera. For models currently in use, the arrangement of the invention may be fabricated as an optional accessory. In all of the embodiments, however, the camera operator is immediately and consistently reminded that, in a flash mode of operation, the camera will function to achieve best results at a select camera-to-subject distance, and, for slower speed film applications where accurate focusing is required at shorter distances, that accurate distance gauging is important. Further, with the arrangement one function of a rangefinder is provided at only a nominal cost. When the instant ranging arrangement is incorporated with cameras of a variety using a simple focusing lens system developing relatively larger apertures for use with slower films, the differentiated segment of the system may be configured such that any resultant photograph will show a face image of good or pleasing size. In addition to the resulting improved picture composition at these distances, the invention will provide for sharp focusing at the preselected camera-to-subject distance which is inserted into the focusing adjustment of a camera lens system. Of course, the system of the invention provides similarly effective results where cameras incorporating lens focusing systems are used in a flash mode. The positioning of the differentiated portion or segment may be arranged with respect to the optical axis of a viewfinder to compensate for any parallax otherwise existing at the relatively close camera-to-subject distance encountered in flash photograph. That is, the segment may be raised slightly a select distance above the optical axis of the viewfinder to provide such compensation. Subsidiary advantage may also be realized from the above-discussed positioning of the differentiated segment. For instance, the positioning may assure more desirable framing or composing of the photographic subject matter within the field of view.

Since certain changes may be made in the above camera-to-subject establishing arrangement without departing from the scope of the invention herein involved, it is intended that all matter contained in the above description or shown in the accompanying drawings shall be interpreted as illustrative and not in a limiting sense.

I claim:

1. A photographic camera comprising:
   housing means for effecting an exposure of a subject upon a photosensitive material;
   a viewfinder including at least one lens element mountable upon said housing means and having an optical path for defining a field of view; and
   means including a segment defining area selectively positioned upon a surface of said lens element for deriving a predetermined camera-to-subject distance when select peripheral portions of said segment appear to coincide with known dimensional aspects of said subject.

2. The invention according to claim 1 wherein said peripheral portions of said differentiating means segment defining area are configured to coincide with the vertical dimension of a human head when said camera is positioned at said predetermined camera-to-subject distance.

3. The invention according to claim 1 wherein said segment is visibly contrasted with the said field of view by a color differential.

4. The invention according to claim 1 wherein said segment defining area is peripherally defined by prismatic lines formed within said lens element and configured to refractively disperse light transmitted therethrough so as to define the periphery of said area.

5. The invention according to claim 1 wherein said segment defining area is visibly contrasted with the said field of view by a color differential.

6. The invention according to claim 5 wherein said segment defining area is selectively positioned with respect to the axis of said optical path in an orientation correcting for any parallax misalignment of said viewfinder subject image and the corresponding photographically recordable image thereof.

7. Apparatus for use with a photographic camera of a variety having means for effecting a photographic exposure, a viewfinder and an artificial lighting unit for lighting a photographic subject from a position adjacent the said camera comprising:

a transparent member having a visibly differentiated area mountable upon said camera in an orientation intercepting the field of view defined by said viewfinder and having a configuration for effecting visible coincidence with the principal vertical dimension of a human head when said camera is positioned from said head a predetermined distance appropriate for the energy capacity of said lighting unit.

8. The apparatus of claim 7 wherein said visibly differentiated area is visibly contrasted with said field of view by a color differential.

9. The viewfinder of claim 7 wherein said transparent member is provided having a select hue.

* * * * *